(12) United States Patent
Wewalaarachchi et al.

(10) Patent No.: US 11,023,845 B2
(45) Date of Patent: Jun. 1, 2021

(54) INTEGRATION PLATFORM TO ENABLE OPERATIONAL INTELLIGENCE AND USER JOURNEYS FOR SMART CITIES AND THE INTERNET OF THINGS

(71) Applicant: EUTECH CYBERNETIC, Singapore (SG)

(72) Inventors: Bandu J. Wewalaarachchi, Singapore (SG); Haran Shivanan, Colombo (LK); Haritharan Gunasingham, Singapore (SG)

(73) Assignee: EUTECH CYBERNETICS PTE LTD, Singapore (SG)

( * ) Notice: Subject to any disclaimer, the term of this patent is extended or adjusted under 35 U.S.C. 154(b) by 925 days.

(21) Appl. No.: 15/044,269

(22) Filed: Feb. 16, 2016

(65) Prior Publication Data

US 2016/0239767 A1    Aug. 18, 2016

(30) Foreign Application Priority Data

Feb. 13, 2015    (SG) .......................... 10201501128X

(51) Int. Cl.
| | | |
|---|---|---|
| G06Q 10/06 | (2012.01) |
| G06Q 10/10 | (2012.01) |
| G06Q 50/16 | (2012.01) |
| G06F 16/00 | (2019.01) |
| G06F 16/28 | (2019.01) |
| G06F 16/901 | (2019.01) |

(52) U.S. Cl.
CPC .......... *G06Q 10/067* (2013.01); *G06F 16/00* (2019.01); *G06F 16/28* (2019.01); *G06F 16/9024* (2019.01); *G06Q 10/1093* (2013.01); *G06Q 50/163* (2013.01)

(58) Field of Classification Search
CPC .. G06Q 10/06; G06Q 10/067; G06Q 10/1093; G06Q 50/163; G06F 8/77; G06F 16/00; G06F 16/28; G06F 16/9024
See application file for complete search history.

(56) References Cited

U.S. PATENT DOCUMENTS

| | | | |
|---|---|---|---|
| 9,800,517 B1 * | 10/2017 | Anderson | ............... H04L 47/70 |
| 2006/0026168 A1 * | 2/2006 | Bosworth | ................. G06F 8/60 |
| 2007/0276715 A1 | 11/2007 | Beringer et al. | |

(Continued)

FOREIGN PATENT DOCUMENTS

| | | |
|---|---|---|
| WO | 2012/150909 | 11/2012 |
| WO | 2014/130568 | 8/2014 |

OTHER PUBLICATIONS

"Informatics Solutions for Smart Metering Systems Integration", by Simona-Vasilica Oprea and Ion Lungu, The Bucharest University of Economic Studies, Romania, Informatica Economica vol. 19, No. 4/2015. (Year: 2015).*

(Continued)

*Primary Examiner* — Pan G Choy
(74) *Attorney, Agent, or Firm* — Whiteford, Taylor & Preston, LLP; Peter J. Davis

(57) ABSTRACT

A "metadata model of a city's Internet of Everything and use thereof to implement citizen engagement through 'user journeys' and system intelligence through automated response logic. A framework that allows system integrators to build a metadata model of a city's IoE, which metadata model then enables city managers to implement user journeys and system intelligence, in incremental fashion, as the business needs of the city evolves.

1 Claim, 8 Drawing Sheets

(56) References Cited

U.S. PATENT DOCUMENTS

| | | | |
|---|---|---|---|
| 2010/0121613 A1 | 5/2010 | Rosca et al. | |
| 2010/0250497 A1* | 9/2010 | Redlich | G06Q 10/06 707/661 |
| 2013/0173539 A1* | 7/2013 | Gilder | G06F 16/27 707/622 |
| 2015/0228004 A1* | 8/2015 | Bednarek | G06Q 10/08355 705/26.8 |
| 2015/0278397 A1* | 10/2015 | Hendrickson | G06F 16/9024 707/798 |
| 2019/0265971 A1* | 8/2019 | Behzadi | G06F 16/288 |

OTHER PUBLICATIONS

"Comparative Study of Smart Cities in Europe and China", by Kang Yanrong, et al, China Academy of Telecommunications Research (CATR), Jun. 2014. (Year: 2014).*

"Real-time Measurement and Control of Urban Stormwater Systems" by Brandon Preclaro Wong, a dissertation submitted in partial fulfillment of the requirements for the degree of Doctor of Philosophy in the University of Michigan, 2017. (Year: 2017).*

Koreshoff, T.L. et al. "Internet of Things: a review of literature and products" OzCHI'13, Nov. 25-29 2013, Adelaide, Australia, pp. 335-344.

Zanella, A. et al. "Internet of Things for Smart Cities" IEEE Internet of Things Journal, 2014, vol. 1, No. 1, pp. 22-32.

International Search Report issued in co-pending International Patent Application No. PCT/IB2016/050762 dated May 20, 2016.

Singapore Search Report issued in co-pending Singapore Patent Application No. 10201501128X dated Dec. 8, 2016.

* cited by examiner

INTEGRATION PLATFORM TO ENABLE OPERATIONAL INTELLIGENCE AND USER JOURNEYS FOR SMART CITIES AND THE INTERNET OF THINGS

BACKGROUND OF THE INVENTION

Field of the Invention

This invention relates to the field of smart infrastructure management—also known as Smart City solutions.

Description of the Background

The field of infrastructure management has historically been limited to "silo-based" applications and operations, in which data captured through devices and human data entry stays in the applications in which it was captured or entered. Where integration across systems is required, custom solutions are made by solution integrators. These custom solutions are typically designed to serve trained operators, such as facilities managers or building engineers.

SUMMARY OF THE INVENTION

The IoT and the IoE

Since the advent of the internet, city system infrastructures have grown in sophistication and variety. During last decade, many internet-based devices have made their way to marketplace—ushering in the era of the Internet of Things (IoT), and building, building complex, neighborhood, town and city infrastructures are evolving from 'systems and devices' to the "Internet of Everything" (IoE)—which includes every device, system, network, application, cloud service, and even person, that is connected to the internet. Indeed, any person with a smartphone is now a node of the IoE. In order to be effective and efficient, system integration must no longer be merely between 'systems'—it must include IoE.

Smart City—Smart Management of Infrastructure

In short, the widely growing adoption of digital technologies to manage cities, with the goal of enhancing performance of city operations, reducing cost and improving service to citizens (end-users of systems), demands a sophisticated approach to infrastructure management. These infrastructures include both physical systems such as energy and water supply, transportation, etc., and software systems such as supervisory and data acquisition (SCADA), maintenance management, lease management, etc.

The complexity of smart city implementation comes from two fundamental challenges: first, a smart city according to the invention is a 'living system' which must constantly evolve to serve city needs and to reflect constantly changing and moving citizenry/population; and secondly, people and skills involved in modeling city services are different from people and skills involved in system implementation and integration. That is, the smart city solution of the invention must be highly intuitive, as mobile users have a very short operation/attention timespan—they expect a system to provide ONLY what they need to carry out their operation.

The present smart city solution addresses this by modeling 'user journeys'—providing a template containing the anticipated exact steps (interactions with the system of the invention) that a particular type of user will require or carry out achieve an objective.

Solution—a Metadata Model of the City's IoE

The present invention solves the problem by implementing a "metadata model of a city's IoE," and using the metadata model of the city's IoE to implement citizen engagement through 'user journeys' and system intelligence through automated response logic. More specifically, the present invention provides a framework that allows system integrators to build a metadata model of a city's IoE, which metadata model then enables city managers to implement user journeys and system intelligence, in incremental fashion, as the business needs of the city evolves.

The following is a summary of some of the features of the present invention:

a) The invention extracts metadata from the Internet of Everything, i.e., networks of computers, subsystems, applications, devices, people (their smartphones) and cloud services, including data and methods. Each of these items, and any person with a smartphone, is a node of the IoE.

b) The invention sets up relationships between individual metadata elements to form a metadata model for the city;

c) The invention processes events, and applies analytics to filter and qualify events—this steps is sometimes referred herein as operational intelligence;

d) The invention sets up automated sequences of actions to 'self manage' known situations;

e) The invention sets up 'user journeys'; and f) The invention connects with end-users (citizens) through unified communication.

Example

A metadata model of a smart city having been built using the present invention, including all the devices, systems, subsystems, devices, networks, applications, data, etc., that are connected to the internet, the system receives metadata from a building control system reflecting a room temperature of 26 degrees, within normal parameters. However, the system of the present invention is monitoring metadata related to user-devices (mobile phones) of building occupants [metadata model] who are sending out Tweets indicating 'office is hot.' The system correlates the control system metadata concerning room temperature with metadata from other systems, i.e., mobile phones on the IoE [event processing & analytics], and the system qualifies the situation as "important to respond" and sends an SMS [unified communication] to the facilities manager of the building indicating that building occupants feel uncomfortably warm. The facilities manager opens his mobile app, and it will show a single page with the details of the problem, and also what system thinks the root cause is—for example, perhaps an "energy saving" mode has automatically kicked in due to a sudden rise of dynamic energy price. The same mobile app page can give the facilities manager the option to turn off the energy saving mode, and will show how much extra it will cost the company, without the facilities manager having to navigate to various systems to gather such knowledge. This is an example of modeling a user (in this case, a facilities manager) journey.

Accordingly, there is provided according to the invention the following features:

a) Devices (generating information, and acting based on received information), applications (holding information and processing information) and people (receiving information and acting based on them) are part of a single metadata model.

b) Building the model automatically (based on events) and continuously & dynamically modifying the metadata model as city elements change.

c) Use metadata relationships to extract metadata from existing nodes or from subsystems (using connectors) to build & update metadata nodes.

d) Metadata model being 'machine readable' due to predefined templates defining well-known metadata structures.
e) Cross reference between existing metadata nodes (enabling progressive implementation).
f) Enabling/augmenting operational intelligence using metadata model.
g) Citizen engagement through 'user journeys' (a sequence of operations that are specifically designed to achieve an objective) rather than merely enabling access to a bunch of applications
h) Applying such solution to 'city wide infrastructure.'

Accordingly, there is provided according to the invention a system for integrated management of the infrastructure of a community, where the infrastructure includes a plurality of network-connected infrastructure systems, subsystems, devices, and applications, and where the systems, subsystems, devices and applications are independent and unintegrated, the system including:

- a user-defined machine-readable metadata model comprising predefined metadata node templates defining metadata structures for said infrastructure systems, subsystems, devices, and applications;
- connector modules configured to collect metadata from said infrastructure systems, subsystems, devices, and applications;
- an event engine that receives metadata from said connector modules and which populates metadata node templates using said metadata to create, populated metadata nodes;
- a dynamic metadata map/model assembled by said event engine, comprising populated metadata nodes, including relationships between nodes based on said collected metadata, and
- pre-defined operation sequences, based on the occurrence of events received from the connector modules, which pre-defined operation sequences define a set of operations according to predicted end-user requirements in response to pre-selected events.

There is further provided according to an embodiment of the invention a system wherein the community is a city.

There is further provided according to an embodiment of the invention a system wherein the community is a single building.

There is further provided according to an embodiment of the invention a system wherein the community is a collection of buildings.

There is further provided according to an embodiment of the invention a system wherein the community is a workplace or single-tenant space within a multi-tenant building where some subsystems (such as air conditioning) belong or are operated by the building and/or building management, while other subsystems (such as card access & CCTV) are owned and/or managed by the tenant.

There is further provided according to an embodiment of the invention including cross references between existing metadata nodes.

There is further provided according to an embodiment of the invention a system wherein the event engine is configured to build the dynamic metadata map automatically, continuously, and dynamically, modifying the metadata map as collected metadata changes.

There is further provided according to an embodiment of the invention a system wherein the event engine is configured to use metadata relationships to extract metadata from existing nodes or from subsystems to build and update metadata nodes.

There is further provided according to an embodiment of the invention a system wherein the dynamic metadata map/model contains metadata notes for a plurality of infrastructure systems, subsystems, devices, and/or applications that are involved in a service workflow, wherein a service workflow comprises a set of pre-selected information that presented to an end user and said predefined operation sequences.

There is further provided according to an embodiment of the invention a system wherein the predefined operation sequences comprise an end-to-end service workflow for end-users of the system by having metadata model undertake integration with multiple subsystems involved in the service workflow.

There is further provided according to an embodiment of the invention a system further including an analytics engine configured to identify and correlate events and to update existing events or create new events based on identified correlations.

There is further provided according to an embodiment of the invention a system wherein the event engine is configured to send commands to one or more of said infrastructure systems, subsystems, devices, and applications based on the receipt of one or more event conditions received by the event engine.

There is further provided according to an embodiment of the invention a system wherein the network comprises the Internet.

There is further provided according to an embodiment of the invention a system wherein the network comprises only private networks.

DETAILED DESCRIPTION OF THE INVENTION

Dynamic Metadata Map

Figure 1:
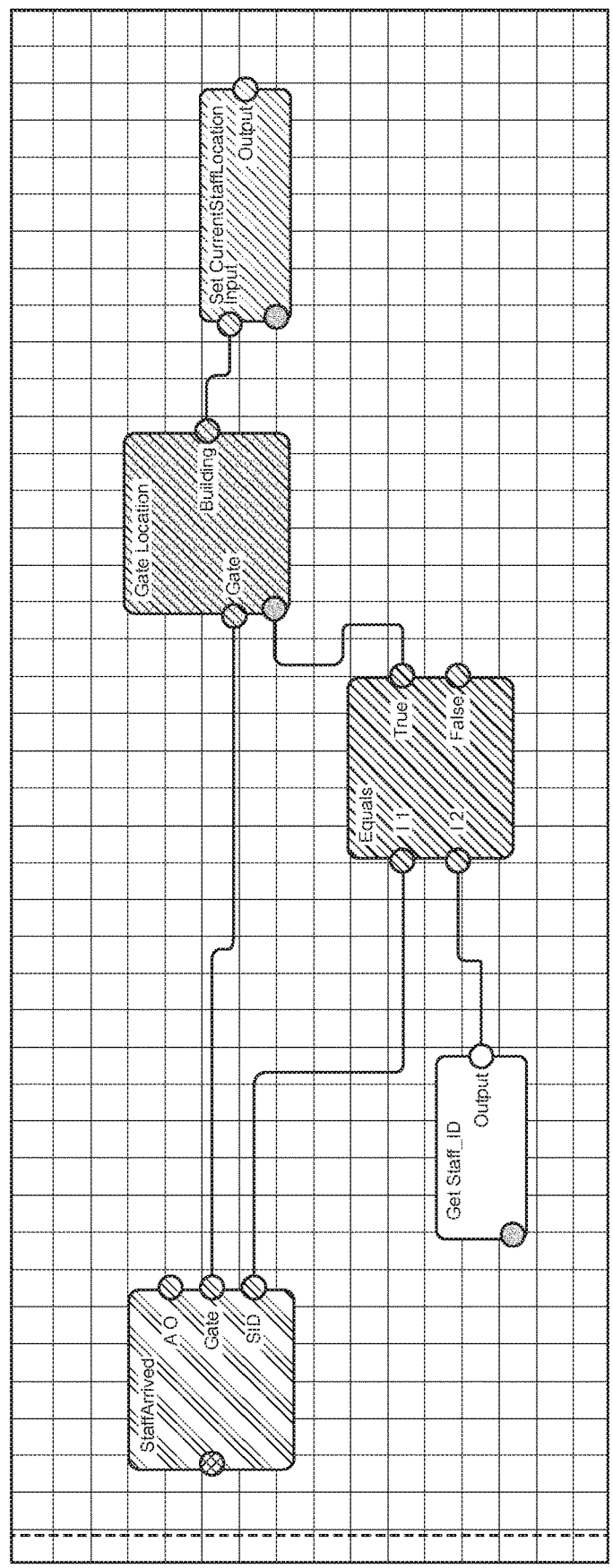
FIG. 1 shows how a user (e.g., a system integrator) has defined event processing logic in the metadata node template.

The present invention may be used in any community (workplace, building, building complex, neighborhood, town, or city) that might benefit from the integrated management of infrastructure systems, the use or operation of which impacts or is impacted by devices, systems, networks, applications, and persons (smartphones) in the IoE. "Workplace" as used herein refers to a single-tenant space within a multi-tenant building where some subsystems (such as air conditioning) belong or are operated by the building and/or building management, while other subsystems (such as card access & CCTV) are owned and/or managed by the tenant. However, the invention is most useful in the case of a city wide IoE or other large collection of devices, systems, and networks, the members of which (in particular the people using smartphones) are constantly in flux, moving within the system, and moving into and out of the system. Using the case of a Smart City as an example, the system of the invention includes a metadata map or "model" that is made up of metadata nodes that represent the IoE—each internet-aware device/entity in the city. Since this comprehensive metadata model includes people with smartphones who are constantly moving around and going in and out of the city, also referred to herein as the solution boundary, the metadata model is adapted to be constantly, dynamically, and automatically changing as the available metadata changes. According to a preferred embodiment, there will be only one metadata map for the entire city with millions of metadata nodes connected to each other directly or indirectly.

Metadata Nodes

The metadata model is made up of metadata nodes. Each node is a collection of metadata. For example, 'Meeting Room One' is a Facility-type metadata node, and it carries metadata such as 'Location', 'Seating Capacity', 'Amenities', etc. Other types of metadata nodes include: Visitor, Staff, Equipment, Work Order, and Room Booking. In the case of Work Order and Room Booking types of metadata nodes, these metadata nodes represent transactions that are dynamically introduced while system is in operation. Further, a Room Booking metadata node may contain metadata of Facility (meeting room), Staff (host) and Visitor (attendee). Visitor-type metadata nodes might be identified by a telephone number or an email address; in this way, a visitor's mobile phone constitutes a physical representation of the visitor, which in turn is represented in the invention as a metadata node on the system with, for example, the mobile phone's telephone number or email address(es). Likewise, a Staff-type metadata node might also be identified by a telephone number, email address, name, organization, department and/or work location. An Equipment-type metadata node might include Asset-ID, Asset Category, Installed Location, Serving Locations (where it serves, which may be different from installed location), Assignee (User), Related Equipment, Make, Model and/or Serial number. A Work Order type metadata node might include Work Order ID, Service Category, Location, Work Description, Assigned Vendor/Technician, Supervisor and/or Deadline to Complete.

Events and Event Engine

Constructing and modifying of metadata nodes is done by an 'event engine'. It receives metadata in the form of 'events'. Events are generated by a Connector module, described below. An exemplary event might be 'Visitor V001 arrived at Gate G001'. Upon receiving new or modified metadata, the event engine either creates new metadata nodes or modifies existing nodes to absorb newly received information into metadata model. In another example, a staff member in the office may be represented by a Staff metadata node carrying two metadata (among others): Staff ID and Current Location.

Event filtering and processing is also done by the event engine, based on the logic defined in metadata model template. The metadata model is configured to allow a user to establish an 'action sequence' that defines how engine will process incoming events.

FIG. 1 shows how a user (e.g., a system integrator) has defined event processing logic in the metadata node template, which will be followed by the event engine. When Staff Arrived event is received, it has two metadata: Staff ID (SID) and Gate (through which Staff member arrived, and where event was captured). Event is compared against Staff ID to determine if the event belongs to this Staff member. If not, Event is ignored. Gate parameter that is associated with the Event is used to find the Location it belongs to, then assign that Location as Current Location metadata of Staff member. This forms a new connection between Staff node and Location node. As Staff moves around the building, more such events will arise, and Staff's Current Location will be dynamically updated.

Metadata Node Template

A central feature of the invention is a metadata node template, which is defined by the user (e.g., system integrator) and which defines how a metadata node should represent an entity, how metadata nodes should be connected to one-another. A metadata node template is a passive element that describes the contents of a node, which contents constitute instructions to the event-engine for assembly of the nodes and the relationships between them (the metadata nodes and relationships together constituting the metadata model/map). All instructions to the event engine go into the template which is editable by system integrator to modify behavior of the entire system.

Figure 2:
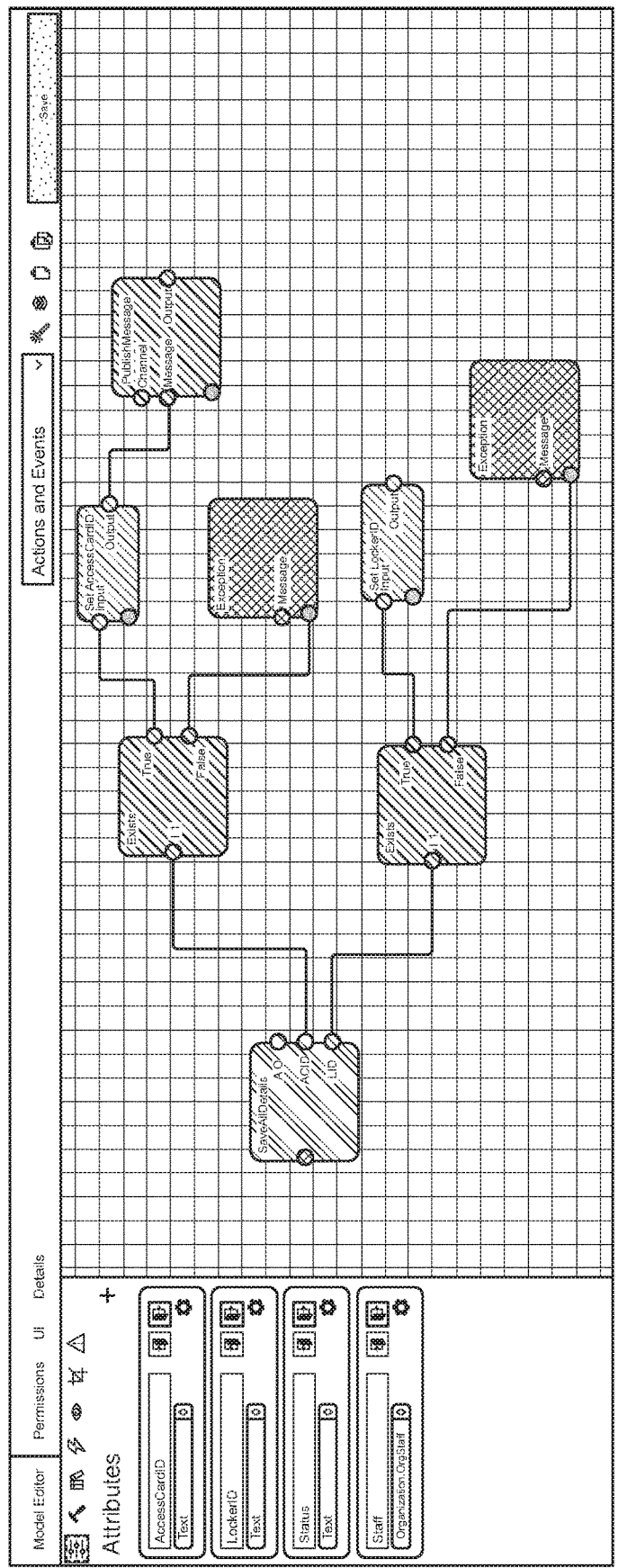
FIG. 2 shows a metadata model editor which a user can access to build a metadata template according to an embodiment of the invention.
Figure 3:
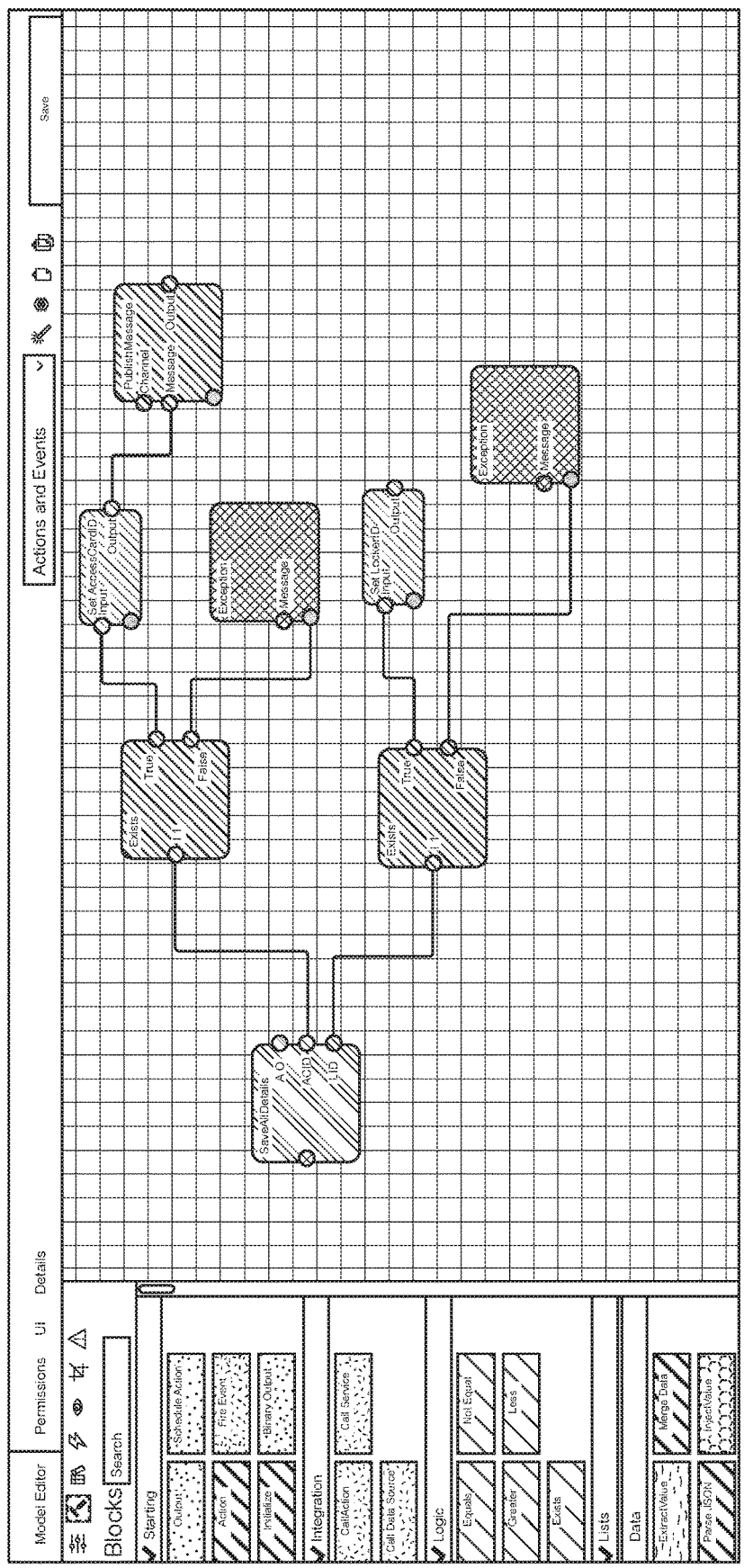
FIG. 3 is another view of a metadata model editor which a user can access to build a metadata template according to an embodiment of the invention.

The user builds the metadata template using a metadata model editor, see FIGS. 2 and 3. The metadata model editor walks a user through the selection of various types of metadata nodes, the metadata they include, and actions to take as events are collected and processed by the event engine. For example, the 'Visitor in Building' node template would identify 'Arrived Gate', 'Meeting Location' and 'Host' as metadata placeholders. Upon receiving 'visitor arrived' event, new 'Visitor in Building' node would be created by event engine to represent Visitor V001.

Forming Metadata Model

Figure 4:
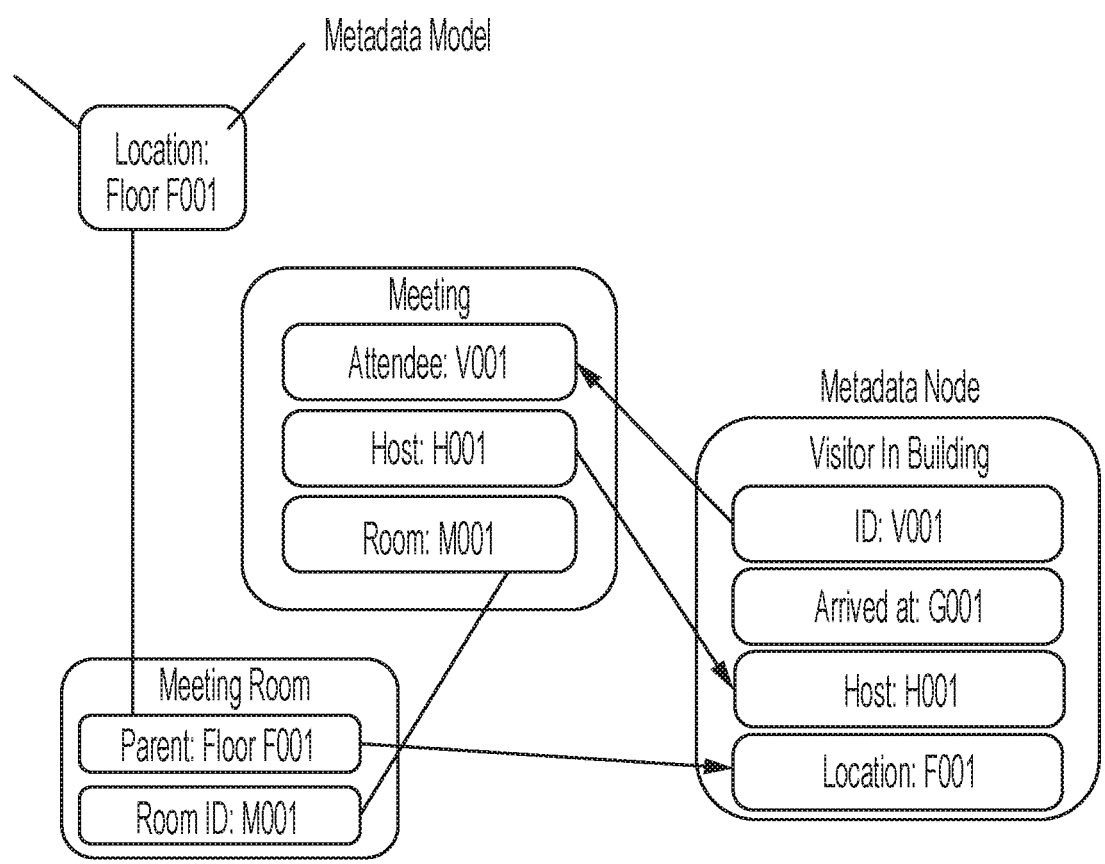
FIG. 4 is a diagram showing a metadata model according to an embodiment of the invention.

Referring to FIG. 4, the 'metadata model' is formed by connecting metadata nodes through common metadata that exists in different nodes. This is done by the event engines as part of the processing of received events. In the above example, upon receiving 'Visitor V001 arrived at gate G001' event, two embedded metadata (visitor's ID and gate's ID) are extracted and stored in metadata placeholders in the node. Further, the metadata node template (Visitor in Building) also requests the event engine to identify 'meeting location' and 'host', to complete its structure. The event engine explores existing metadata models to find matching nodes and to extract missing metadata to complete the node as specified by node template. Once a metadata node is made (by the event engine), only 'metadata elements' in it can be modified in order to store information (such as Staff→Name) or to make a connection to another metadata node (such as Staff→CurrentLocation). Action sequences defined in the template are embedded in the node (like DNA), but not individually alterable, except using the metadata model editor. That is, action sequence portions of the metadata node do not change based on receipt or processing of metadata.

Thus, the Metadata map or model is the mesh or network of metadata nodes (built using metadata organized according to metadata note templates), which nodes are "connected" using the relationships that are reflected in the metadata. For example, Staff-JohnSmith node forms a metadata map (on a microscale) with Building-125IndustrialDrive node when CurrentLocation metadata (of Staff-JohnSmith) carries the reference to Building-125IndustrialDrive. According to a preferred embodiment of the invention, the metadata map encompasses an entire city, with millions of metadata nodes constructed using collected metadata and assembled using metadata node templates, and the relationships between which are also defined by common metadata elements between metadata nodes.

Extraction of Metadata from Subsystems

Figure 5:
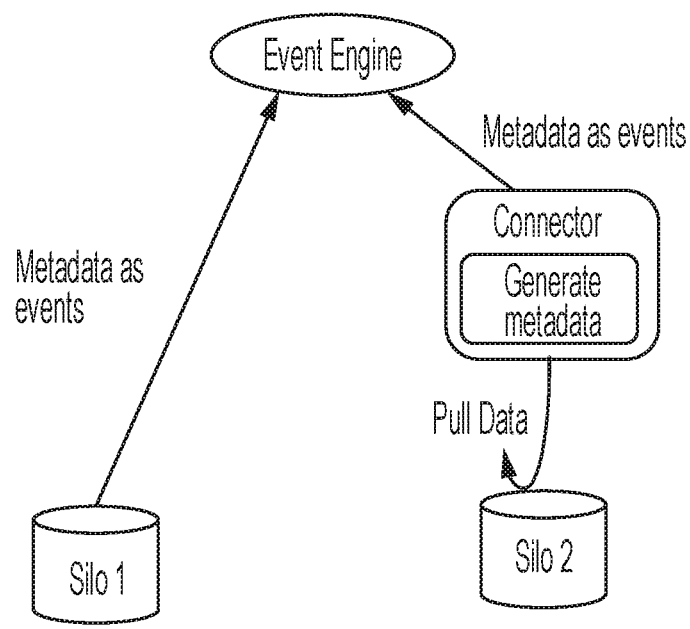
FIG. 5 is a representation of the extraction of metadata from subsystems to populate a metadata model according to an embodiment of the invention.

Referring to FIG. 5, the collection and/or extraction of metadata from systems, subsystems, networks, devices, applications and other elements of the IofE requires identifying data elements and methods of the silo-system. A "Connector" or "a software executable, identifies metadata from the various internet-aware elements of the IofE and sends them to the 'event engine' as 'events'. According to an embodiment of the invention, there is a specific "Connector" for each subsystem/application that the invention collects information from so with Connector can effectively communicate with the target/corresponding/associated subsystem/application. The Connectors then transform the events into the format that event-engine can understand and send it to the event engine.

Alternatively, certain subsystems may be programmed to 'push' their metadata to the event engine directly, for example using their own Connectors configured to communicate with the system of the invention.

Examples of subsystems according to the invention include: air conditioning and heating systems, elevator systems, card access systems, CCTV systems and BMS (building management systems). Applications are addressed in the same way as any other subsystem. Mobile devices (such as a temperature sensor inside transportable refrigerator) report their status to a central server, and a Connector specific to that device's system will pick it up from the central server. With respect to IoT-devices, they carry an IP-address that allows a Connector to directly address them. Smartphones and Networks are not considered a subsystem, although, a smartphone could represent a device or system through a connector (app) installed in the smartphone—for example, a connector placed in the smartphone could detect the proximity of iBeacon thereby determine current location of the Visitor and notify event engine.

Correlation of Events

In the above example, the Connector may receive information reflecting that Visitor V001 is leaving the building, i.e., Visitor V001's entry/exit card was presented at a security device-monitored exit point. At that point, Connector will raise 'Visitor V001 left' event. The event engine will correlate this event to existing 'Visitor In Building' node for V001 and make the necessary updates to reflect the current status.

Navigation Through Metadata Model

Figure 6:
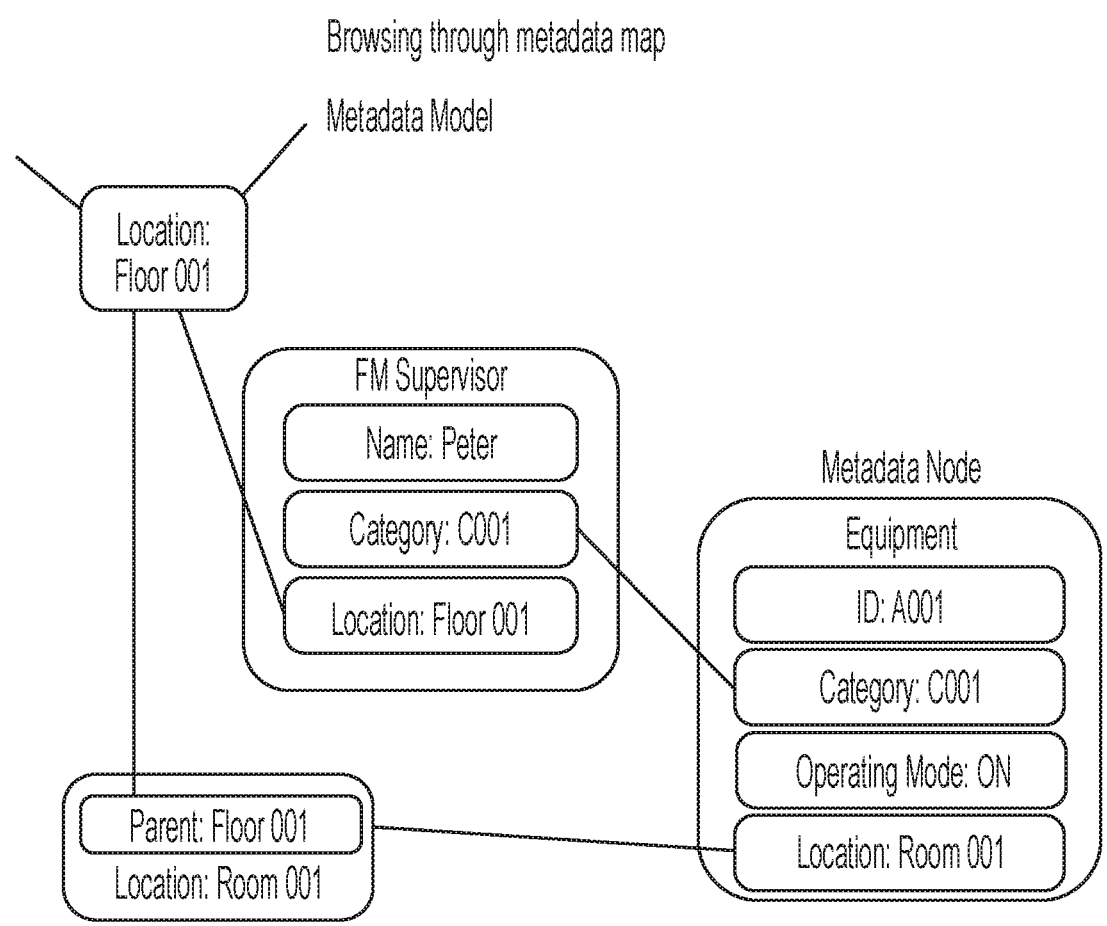
FIG. 6 is a representation of how metadata node relationships can be established using common metadata present in different metadata nodes.

Referring to FIG. 6, the metadata model (collection of nodes) behaves similar to an 'object collection' in object oriented programming. That is, it forms a hierarchy (such as parent—child relationship in Locations), and it carries object attributes (such as node's attributes representing metadata) and methods (actions represented by metadata).

For example, Location metadata ('Room 001') of equipment ('A001') gets attached to Location ('Room 001') attribute (metadata). Location hierarchy makes it immediately inherit parent location ('Floor 001') of Room 001. In this way, for example, any service that is looking for 'photocopy machines' (equipment of category 'photocopy') at Location 'Floor 001' will now find A001. The metadata model is a machine readable structure that does not require a human to browse through it.

Cross References Between Metadata Nodes

Figure 7:
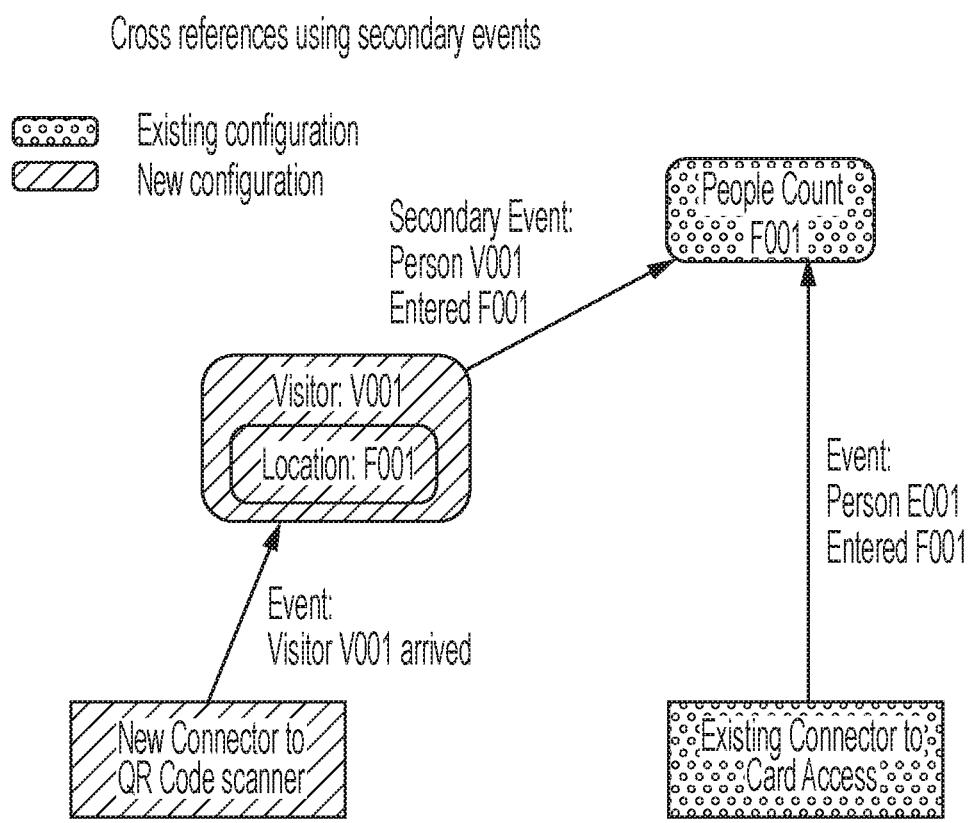
FIG. 7 is a representation of how an embodiment of the invention reacts to new devices entering or interacting with the "Smart City."
Figure 8:
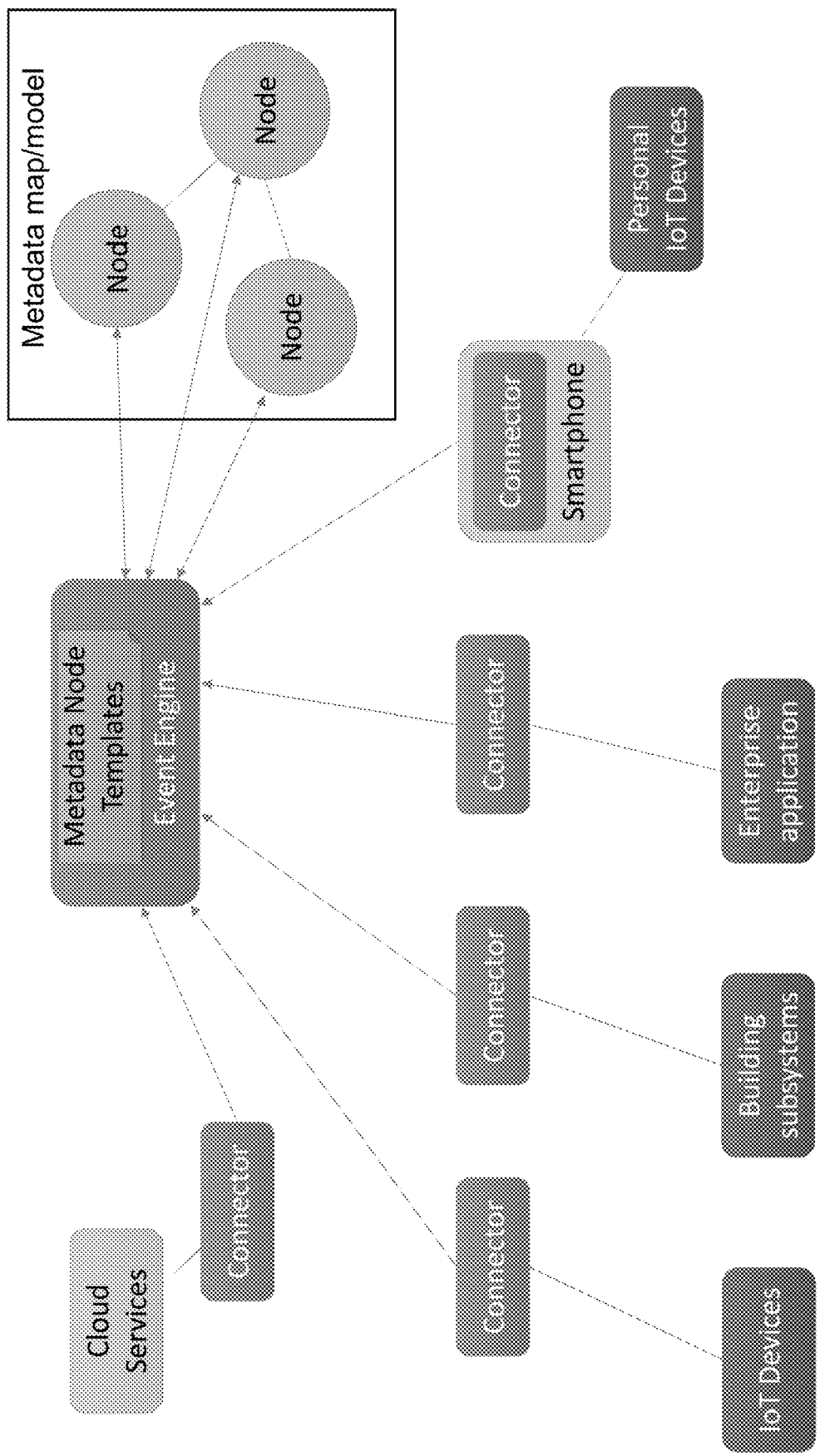
FIG. 8 is a representation of different parts of the invention and their relationships.

The invention allows system implementation to take place progressively. When the system (the metadata map) is expanded by adding new metadata node templates and connectors, the system of the invention generates/builds cross references between new nodes and existing nodes, without having to modify existing nodes. Referring, for example, to FIG. 7, originally implemented 'people count' map node (representing floor F001) maintains a list of employees in F001, collected from Card Access system, which is required in case of emergency evacuation. However, people count node is initially not aware of newly introduced event 'Visitor001 arrived', collected from QR Code scanner. Therefore, when a new visitor arrives, it doesn't reflect on people count. The invention addresses this by having newly introduced Visitor node raise a 'secondary' event, 'Person V001 entered F001', which is recognized by original people count node (without having to modify it).

Consolidated Actions—Orchestrations

As explained in the example above, 'people count' node has a list of people (both employees and visitors) who are currently in floor F001. The present invention allows a system integrator to define a single action for an event associated with a metadata node, e.g., "notify emergency evacuation" to everyone in F001 in the event that metadata is received reflecting an emergency situation, for example, a terrorist threat, fire or smoke, regardless of the silo that captured their presence on floor F001, whether it was Room Booking systems managing visitors, Work Order system managing contractors, or Space Management system managing seating locations for internal staff, and/or regardless of what silo captured the existence of an event, whether it was twitter feed from personal devices, email applications, a building/workplace fire detection/suppression system, and/or any other system or application.

Automated Orchestrations

In some cases, it is required to automatically execute a series of actions, upon receiving an event. For example, People Count node may also be programmed to send SMS notification to all 'persons' in the particular floor when evacuation is ordered. More importantly, additional metadata that would identify a person as 'handicapped' could enable people count node to send a notification to facilities managers about locations of handicap persons in the building with instructions to provide special handling and assistance during the evacuation.

Complex Event Processing (Analytics)

The invention includes an analytic engine that is able to process events and event—data to identify patterns and correlations. Examples are as follows:

a) Generate extended event based on repeated basic events within a given timespan (repeated "card rejected" event may generate "card reader faulty" event)

b) Correlate repeated events into a single event (repeated smoke—detected events indicates the single fire—incident event)

c) Transform data by consolidation of events, and include them as a new event; for example power consumption data collected/received in a series of events can be consolidated into "energy usage" data)

d) Predict secondary events by analyzing heuristics of primary events. For example, event history may indicate that a sustained 'car park full' event is generally followed by 'dirty toilet' feedback event for a particular restroom located next to car park. According to this example, the correlation between events is not configured by the user (system integrator or facilities manager); rather it is a correlation that is automatically identified by the analytic engine through analysis of event and event history data.

Enabling Operational Intelligence

The present invention also processes events through analytics, allowing identifying meaningful events—both threats and opportunities, therefore enabling "operational intelligence." For example, when one smoke detector reports a fire in a particular location, a new metadata node may be initiated to build necessary connections between the city's metadata elements and to orchestrate certain actions such as notification to first responders. A few minutes later, more smoke detectors (in that Location) will likely report a fire. The system's response to $2^{nd}$ and $3^{rd}$ smoke detected events should be different from the first event. They act as "confirmation" to first event, rather than initiating new fire—incident scenarios.

Similarly, additional metadata can be appended to an event to add "more sense." In the same example above, if the first smoke detected alarm came from a detector that has produced a 'false alarm' a week ago, it would be wise to look for a 2nd confirmation from another detector, or a human confirmation, before the orchestration is carried out to respond to a fire.

Enabling Predictive Operations

According to a preferred embodiment of the invention, operational intelligence produced through this invention is 'machine readable'. As a result, it allows predetermined orchestrations to be executed based on complex event conditions. This allows operators to manage the infrastructure predictively. For example, in a large space such as the lobby of a shopping mall, it takes a long time for the air-conditioning system to react when more shoppers come into the mall. This is due to the natural delay in warmed air reaching air-conditioning ducts on the roof, where sensors are placed to recognize the rising temperature. The present invention allows system integrators to setup an orchestration that acts on 'people count' that is monitored through an independent system to influence air-conditioning system to produce more air-conditioning, predictively.

The invention claimed is:

1. An apparatus for integrated management of infrastructures of a community, comprising:
   A) a plurality of infrastructure systems, one or more mobile phone devices, and end-user enterprise software applications,
   B) a computer processor,
   C) a computer memory storage device storing a computer-readable database, computer software application, and computer executable instructions,
      i) said computer-readable database, comprising a user-defined metadata model database comprising pre-defined metadata node template data structures defining metadata structures for each of said plurality of infrastructure systems, said mobile phone devices, and end-user enterprise software applications;
      ii) said computer executable instructions comprising instructions in computer languages specific to each of said plurality of infrastructure systems, mobile phone devices and end-user enterprise software applications
      iii) said computer executable instructions, when executed by the computer processor, cause the apparatus to carry out the steps of:
         1) communicating with said infrastructure systems, mobile phone devices, and end-user enterprise computer software applications over a communications network;
         2) collecting metadata from said infrastructure systems, mobile phone devices, and end-user enterprise computer software applications;
         3) receiving metadata from one or more connector modules associated with said infrastructure systems, mobile phone devices, and end-user enterprise computer software applications,
         4) populating metadata node template data structures using said metadata to create populated metadata nodes; and
         5) generating
            a) a dynamic metadata model database, comprising populated metadata nodes, including relationships between nodes based on said collected metadata, and
            b) operation sequences comprising an end-to-end service workflow based on occurrences of events received from the connector modules, wherein said operation sequences define a set of operations according to predicted end-user requirements in response to pre-selected events;
         6) updating the dynamic metadata model automatically, continuously, and dynamically, modifying the dynamic metadata model as collected metadata changes;
         7) transforming said operation sequences into commands in a format specific to respective ones of said infrastructure systems, mobile phone devices, and computer software applications; and
         8) sending said commands to one or more of said infrastructure systems, mobile phone devices, and computer software applications to carry out an action based on said end-to-end service workflow and receipt of events recorded by a different one of said one or more of said infrastructure systems, mobile phone devices, and computer software applications; and
         9) wherein said action comprises changing current operation status or modifying existing operation sequences of the one or more of said infrastructure systems, mobile phone devices, and computer software applications.

* * * * *